INVENTOR.
LEE C. ROCK
BY Harry A. Herbert Jr
Herbert H. Brown
ATTORNEYS 3,421,188
PRESSURE SEALING CLOSURE FOR FULL PRESSURE ASTRONAUT'S OR DIVER'S ASSEMBLY
Lee C. Rock, Fairborn, Ohio, assignor to the United States of America as represented by the Secretary of the Air Force
Filed Nov. 29, 1966, Ser. No. 597,820
U.S. Cl. 24—204    3 Claims
Int. Cl. A44b *19/24;* A44b *21/00;* B63c *11/04*

ABSTRACT OF THE DISCLOSURE

A water- and air-tight closure for the entrance openings of an astronaut's suit and as a substitute for a zipper arrangement, the closure being constituted of a rounded plug member extending along one side of the opening and a concavity member of curved configuration extending along the other side of the opening. The plug and concavity members fit one within the other to form a hermetic seal when pressure is applied between them. The seal is maintained by a multiplicity of hooks and loops which are secured to certain extended surfaces of the plug and concavity members to rigidly hold the members in the pressed position. The hook and loop structures can be separated by an outward pull when the seal is to be broken in order to expose the entrance openings of the suit.

---

The invention described herein may be manufactured and used by or for the United States Government for governmental purposes without the payment to me of any royalty thereon.

The present invention relates to pressure suits for astronauts and divers, more particularly to pressure sealing closures for the openings in such suits.

In order for a man to get into a pressure suit it is necessary to provide a number of peculiarly positioned openings on account of the cumbersomeness of the parts. An astronaut's suit is generally interlined with a bladder made of a thick, specially treated fabric, sometimes rubber, which obviously must be constituted of as few parts as possible and must extend right up to the edge of the openings in order to avoid leakage. The bladder is protected on the outside by a tough fabric so that the composite thickness may present a certain amount of stiffness to the suit as a whole. Considerable difficulty is therefore encountered in properly positioning the openings for easy access to the astronaut in putting on or taking off the suit. These openings have to be large enough to receive his entire body including the arms and legs, so the linear length of the opening may be considerable. The above considerations represent a severe problem in obtaining an absolute sealing effect against pressure from the inside or outside, over the entire length of the closure for the opening, not only to prevent the escape of gas from within the bladder but also to prevent seepage of the atmosphere into the space between the bladder and the outer lining in and around the closure.

It has been proposed heretofore to employ the zipper form of closure for the purpose mentioned since the metal slide is readily accessible to the contained astronaut. However, it was found that the metal slide, upon separating the sealing lips of the closure member when the zipper is open tends to bite into the sealing lip on one side of the closure. After a number of passes of the slide, the opposed sealing lips become marred or deformed to an extent as to allow excessive leakage. Moreover, the slide of the zipper is relied upon, not only to press the rubber lips at the seal together, but also to hold them in a tight position. Consequently, any wear at the teeth of the zipper tends to weaken this holding effect and allow slight but important leakage between the lips.

An object of the invention is to provide a pressure sealing closure suitable for long openings in full pressure suits which employ sealing lips at the joint but avoid the use of zippers.

Another object is to provide a sealing closure for pressure suits which employ no metal, and thus reduce the weight of the suit.

A more general object is to provide an improved pressure sealing closure for use in a high altitude, full pressure assembly with increased flexibility, durability, and a reduction of weight and bulk.

The above objects are carried out in brief by separating the functions of sealing the closure to the suit from the function of holding the seal in position and employing separate devices for each function, both of which allow a certain amount of adjustment to take-up wear. In particular, a special form of sealing joint is provided which of itself effects a tight seal and the effectiveness of the seal is maintained by a unique hook and loop structure.

The invention will be better understood when reference is made to the following description and the accompanying drawings in which.

Figure 1:
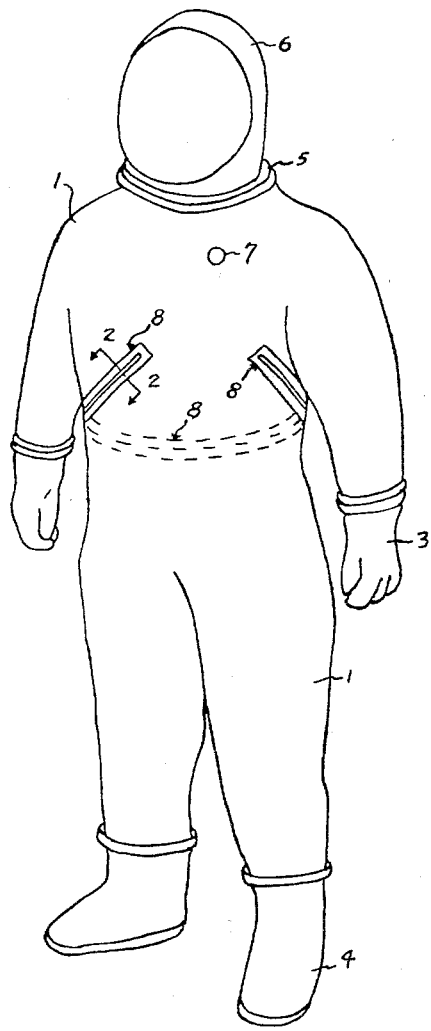
FIG. 1 represents diagramatically a pressure suit blown up to full pressure and showing the extended opening which is sealed in the improved manner.

Referring to FIG. 1, reference character 1 designates the outer fabric of the suit which may be constituted of an oxford-weave nylon, high-temperature formulation or any other tough, flexible, water- and air-proof fabric. Within the outer cover, there is a so-called gas bag or bladder 2 (FIG.2) extending throughout the body of the cover, including the arms and legs. The bladder may be made of any suitable water- and air-tight material such as a heavy fabric with multiple coatings of neoprene or other suitable plastic. The bladder is fairly thick and should readily be able to withstand gas pressures of the order of at least four pounds per square inch without any appreciable leakage. The arms and legs of the composite suit terminate in rings (not shown) adapted to be tightened around the wrist and ankle, and to which waterproof gloves 3 and shoes 4 can be attached.

The upper part of the suit is provided with a metal ring 5 having a threaded periphery to accommodate a helmet 6. An opening 7 is provided which leads to the interior of the suit for admitting air or other gas when the proper hose and valve connections (not shown) are made. A pressure protective assembly of the type described is suitable for astronauts working at high altitudes, and for this purpose the gas pressure would be in the neighborhood of four pounds per square inch.

It is necessary that the astronaut be able to get quickly into and out of the suit, quite often without any assistance. For this reason, the suit is provided with openings of various shapes, positions and lengths depending upon the type of suit selected. In the type shown, there is a narrow opening indicated 8 which begins at the right side just above the abdomen and extends around the back at waist high and comes to the front again at the left side of the body. The opening is of considerable length, possibly two inches wide which eventually will be spanned by my improved sealing closure. As stated hereinbefore, it is essential that the closing and opening member be readily accessible to the astronaut and when closed, must be absolutely air- and moisture-tight, also able to withstand considerable pressure difference between the inside and outside of the suit. A zipper connection, although easy to operate, has not been altogether satisfactory in sealing such a closure, particularly when high pressures are required and the closure is under continuous use and wear.

However, in accordance with my invention I have found that be separating the formation of the seal from the structure which holds the seal in position after it is made, I am enabled to avoid the use of the zipper and its teeth arrangement; and instead, use only flexible materials such as fabric and soft molded rubber at the joint. In this manner, the flexibility of the suit at the joint is preserved, and considerable reduction in the weight and bulk of the suit as a whole is attained.

Figure 2:
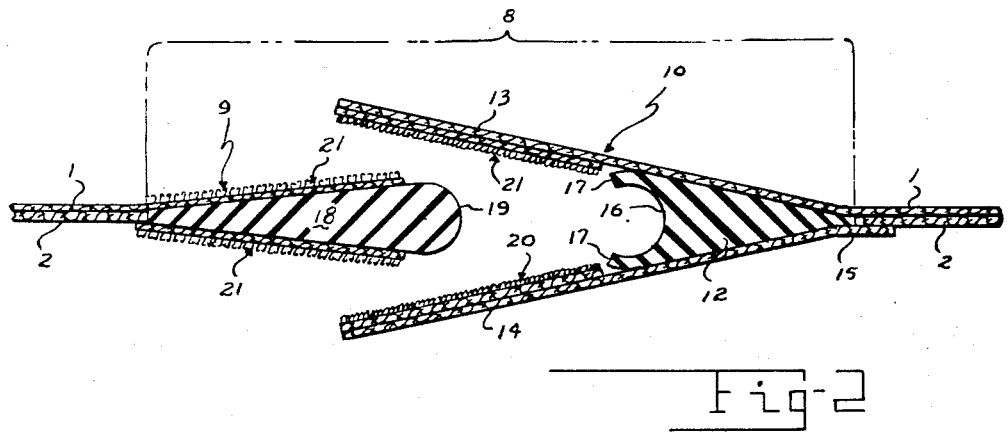
FIG. 2 is a fragmentary sectional view, taken along line 2—2 in FIG. 1, but somewhat enlarged, to show a preferred form of the closure seal.

Referring to FIG. 2, it will be noted that the closure member is made of a male portion generally designated 9, and a female portion generally designated 10. The opening in the suit is indicated by the dot-dash bracket.

In the female portion, the outer fabric or cover 1 is extended along the angular side of a wedge-shaped member 12 of soft rubber to which it is secured by any suitable form of water-proof cement such as the epoxy or silicon resins. The cover is extended beyond the member as indicated at 13 so as to overlap the male portion 9. A strip 14 of the same width as the portion 13 and preferably of the same material as the cover, is secured along edge 15 by a water-proof cement, to the edge of the bladder 2. The strip extends along the inner angular side of the wedge-shaped member 12 to which it is secured, also by proper cement. It is extended beyond the base portion of the member 12 and terminates at a distance about the same as the companion portion 13.

The base of the wedge-shaped member 12 is provided with a circular groove 16 of a size and depth as to leave a pair of oppositely disposed overhanging lips 17, the purpose of which will be made clear presently.

On the male side of the closure, a wedge-shaped member 18 of the molded rubber is employed, terminating in a rounded base 19 (FIG. 2) of a diameter as will fit snugly along the length of the groove 16 when pressure is applied to the member. The lips 17 are useful in that they tend to hold the base firmly within the groove.

Figure 3:
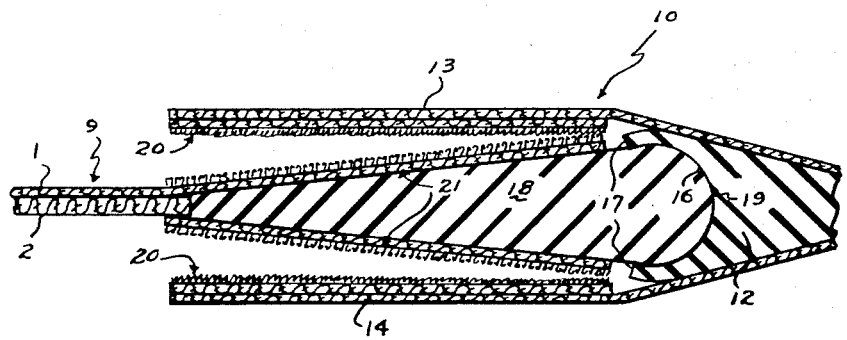
FIG. 3 represents an even more enlarged view, in section, of the portion of the closure illustrated in FIG. 2 in order to indicate the position of the hook and loop structure after the sealing contact has been made but before the seal has been completed.

The next step after the seal has been effected at the bases of the members 12, 18 is to hold the seal securely in position. For this purpose, I employ a hook-loop form of a velvet-like strip which is sold on the market under the name "Velcro" by the Velcro Corporation of New York. This structure is constituted of two parts which when brought face to face provide a strong but detachable joint with one another. One part, as shown in FIG. 3, is constituted of a strip 20 having a multitudinous number of miniature loops of plastic material projecting from one of the surfaces and positioned in rows at right angles to one another. The other part is constituted of a strip 21 to which a corresponding number of hooks of similar material, also arranged in rows and extending outwardly from one surface, is employed. The strip carrying the loops is usually labeled "Velcro felt" and the other part carrying the hooks is known commercially as "Velcro hooks". The Velcro felts 20 are cemented (on their smooth sides) to the inside surfaces of the extended strip portions 13, 14. The Velcro hook strips 21 are cemented on their smooth side to the angular sides of the rubber member 18 but stop short of the semicircular end 19. The strips 21 are of a width as to overlap the thin end of the member 18 and the overlapping portions are cemented to an edge of the bladder 2 at the male side 9 of the closure.

Thus, when a seal has been effected by pressing the base member 19 into the groove 16 and the lips 17 embrace the base member, the strip portions 13, 14 are compressed to cause the hooks of the strip 21 to engage the loops of the strips 20. At least some of the hooks open in opposite directions, as can be seen in FIG. 3 so that the engagement is such that it is practically impossible to move the strips 20, 21 lengthwise, with respect to one another in either direction with the result that the sealing effect at 16, 19 remains intact. However, the strips 20, 21 can be separated by a steady pull outward on the strips 13, 14 to disengage the hooks when it is desired to remove the closure.

It will be noted that the sealing effect at 16, 19, also the maintenance of the seal by the hook and loop construction 20, 21, require no metal whatsoever—no slides or teeth—so that, except for the small amount of rigidity imposed by the rubber elements 12, 18, the joint as a whole is fairly flexible. The sealed closure, regardless of its length, present no more stiffness than any other part of the suit, thus adding to the comfort of the enclosed astronaut. The absence of any metal part reduces in a material degree the weight of the suit. Moreover, there is no wear or tear on the seal or the securement strips, even under repeated use, so that the seal remains intact over a long period of time. Obviously, a certain amount of adjustment can be effected by moving the strips 20 as far as possible toward the left (FIG. 3) when bringing these strips into engagement with the strips 21.

The astronaut can readily extricate himself from the suit since he merely has to loosen the hook and loop joint, after which a slight pull outwardly on the member 18 will cause the seal to break.

While the solid molded form of male member 18 will provide a good seal for practical purposes, I may, if desired, employ a closed cell sponge, either for the entire member or even for the semicircular cap portion 19 in order to effect a still greater sealing capability.

It will be apparent that while the invention has been described more particularly from the standpoint of an astronaut's appurtenance, the improved structure can also be used, with only slight modification, in a diver's suit or in any form of protective clothing where openings are required and an air- or water-tight closure seal becomes necessary.

While a certain specific embodiment has been described, it is obvious that numerous changes may be made without departing from the general principle and scope of the invention.

I claim:

1. A sealing closure for an opening in a pressure protective suit made of a bladder and an overlying layer of fabric, said closure being formed of two portions located at opposite sides of the opening and adapted to be brought together and sealed against pressure; one of said portions being constituted of a wedge-shaped body A of flexible material extending longitudinally of the opening, said body having a base presented to the other of said portions and tapering to a relatively thin edge for securement to the bladder, a circular groove extending along the base of said body; the other of said portions being constituted of a wedge-shaped body B of flexible material extending longitudinally of the opening and secured at the thin end to the fabric and the bladder, the thick end of the body B terminating in a base of circular shape so as to be sealingly received by the groove of the body A when the bases of said bodies are pressed together, the fabric at one side of the opening having an inner surface secured to the surface of said body A and extending to a position beyond its base to overlap the adjacent surface of body B when the bodies are brought into contact, a separate piece of fabric having an inner surface secured to the other surface of the body A and extending beyond its base to a position to overlap the adjacent surface of body B when the bodies are brought into contact, and fastening means secured to each of said inner surfaces of said extended fabric parts and to said adjacent surfaces of the body B for detachably securing the portions of the closure together after the base of the body B has been inserted into the groove of the body A.

2. A sealing closure according to claim 1 and in which said means comprises strips of felt having miniature loops secured to said extended fabric parts, and strips of fabric supporting miniature hooks secured to the sides of the body B whereby the loops associated with body A can receive the hooks associated with body B when the extended felt parts of body A are pressed to make contact with the body B.

3. A sealing enclosure according to claim 1 and in which said means comprises a hook and loop fastening device located at the detachable joint between the extended fabric parts and the respective adjacent surfaces of the body B.

References Cited

UNITED STATES PATENTS

| | | | |
|---|---|---|---|
| 1,913,507 | 6/1933 | Christrom | 24—204 X |
| 2,641,037 | 6/1953 | Gossner | 24—205.1 |
| 3,102,570 | 9/1963 | Fairchilds | 2—96 X |

FOREIGN PATENTS 977,171  12/1964  Great Britain.

HERBERT F. ROSS, *Primary Examiner.*

U.S. Cl. X.R.

2—2.1; 24—205.1